(12) United States Patent
Howarth et al.

(10) Patent No.: US 7,786,861 B2
(45) Date of Patent: Aug. 31, 2010

(54) DETECTING THEFT AND DISABLING STOLEN EQUIPMENT

(75) Inventors: Arthur G. Howarth, Orleans (CA); Roland Saville, Oakland Park, FL (US); Prasad Miriyala, Union City, CA (US); Chandrodaya Prasad, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 11/699,898

(22) Filed: Jan. 29, 2007

(65) Prior Publication Data

US 2008/0180244 A1 Jul. 31, 2008

(51) Int. Cl.
*G08B 13/14* (2006.01)
(52) U.S. Cl. .............. 340/568.1; 340/5.61; 340/825.69; 455/411; 713/166
(58) Field of Classification Search ... 340/568.1–572.3, 340/825.69, 5.61; 455/574, 410, 411; 726/4; 717/174; 707/104.1, 9; 713/166
See application file for complete search history.

(56) References Cited

U.S. PATENT DOCUMENTS

| | | | | |
|---|---|---|---|---|
| 5,712,973 | A | * | 1/1998 | Dayan et al. ................... 726/36 |
| 5,757,271 | A | * | 5/1998 | Andrews ................. 340/568.1 |
| 6,189,105 | B1 | * | 2/2001 | Lopes ......................... 726/20 |
| 6,244,758 | B1 | | 6/2001 | Solymar et al. |
| 6,286,102 | B1 | * | 9/2001 | Cromer et al. ................. 726/35 |
| 6,542,076 | B1 | | 4/2003 | Joao |
| 6,639,513 | B2 | * | 10/2003 | Olsen et al. ............... 340/568.1 |
| 7,061,366 | B2 | * | 6/2006 | Bell et al. ..................... 340/5.2 |
| 7,149,556 | B2 | * | 12/2006 | Angelo et al. ............... 455/574 |
| 2005/0073389 | A1 | * | 4/2005 | Chandley .................... 340/5.31 |
| 2006/0112418 | A1 | * | 5/2006 | Bantz et al. ..................... 726/4 |
| 2006/0148465 | A1 | * | 7/2006 | Perdomo et al. ......... 455/422.1 |
| 2006/0267575 | A1 | * | 11/2006 | Sampson et al. ............ 324/110 |
| 2007/0018843 | A1 | * | 1/2007 | Cullum ................. 340/825.49 |

OTHER PUBLICATIONS

Beyond Passive RFID Tags (white paper), Sensitech, Dec. 2004. 3 pp.
DPL America TITAN Equipment Monitoring System, http://www.dplamerica.com/titan.htm downloaded from the Internet on Jan. 10, 2007, 5 pp.

* cited by examiner

*Primary Examiner*—Brent Swarthout
(74) *Attorney, Agent, or Firm*—Weaver Austin Villeneuve & Sampson LLP (57) ABSTRACT

Some implementations of the present invention provide methods and devices for detecting the theft of, and disabling, electronic devices such as computers and network devices. The devices may be disabled when a signal is not detected, e.g., for a predetermined period of time. For example, a radio frequency ("RF") signal (e.g., a beacon), an Internet Protocol ("IP") signal or the like may define a space within which the devices may be operated with complete functionality. Outside this space, the devices will be disabled, at least to some degree. The degree of disablement may depend on the length of time since the signal was last detected. Alternatively, the devices may be disabled when a signal is detected: some such implementations define "portals," "choke points" or the like past which a device may not be transported without some degree of disablement.

31 Claims, 8 Drawing Sheets

DETECTING THEFT AND DISABLING STOLEN EQUIPMENT

BACKGROUND OF THE INVENTION

1. Field of the Invention

The present invention relates to devices and methods for detecting and preventing theft of equipment, particularly of computer-related equipment.

2. Description of the Related Art

Although the cost of many types of electronic devices has fallen in recent times, some such equipment is quite valuable. For example, as computer and networking equipment become more integrated, the value per ounce and value per square inch have greatly increased. Because such equipment has become increasingly lightweight, the equipment is easier to steal and can be stolen in greater quantity. Therefore, "shrinkage" of such equipment has become an increasing concern for many businesses. Previous methods for avoiding such shrinkage have not proven to be satisfactory. It would be desirable to address at least some of these shortcomings of the prior art.

DESCRIPTION OF EXAMPLE EMBODIMENTS

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Various techniques and mechanisms of the present invention will sometimes be shown and/or described in singular form for clarity. However, it should be noted that some embodiments may include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection that is illustrated and/or described does not necessarily mean a direct, unimpeded connection unless otherwise noted.

Overview

Some implementations of the present invention provide methods and devices for detecting the theft of, and disabling, electronic devices such as computers and network devices. The devices may be disabled when a signal is not detected, e.g., for a predetermined period of time. For example, a radio frequency ("RF") signal (e.g., a beacon), an Internet Protocol ("IP") signal or the like may define a space within which the devices may be operated with complete functionality. Outside this space, the devices will be disabled, at least to some degree. The degree of disablement may depend on the length of time since the signal was last detected. Alternatively, the devices may be disabled when a signal is detected: some such implementations define "portals," "choke points" or the like past which a device may not be transported without some degree of disablement.

Much of the discussion herein pertains to detecting the theft of, and disabling, computers and network devices. However, the present invention encompasses methods and devices for detecting the theft of, and disabling, other types of devices. For example, the present invention may also be used for disabling consumer electronic devices, telephony devices, etc., under certain predetermined conditions. Moreover, the level of disablement may vary according to the implementation and may be configurable by, e.g., a manufacturer, a network administrator, etc.

Similarly, while much of the discussion herein pertains to radio frequency identification ("RFID") technology, alternative technologies, including IP-based technologies, Bluetooth™, near-field communications (e.g., near-field magnetics), and others not mentioned herein may also be used to implement at least some aspects of the invention. Accordingly, the methods and devices of the present invention have very broad utility, both in the public and private sectors.

Some implementations of the invention provide a method that includes the steps of determining whether a signal is detected and controlling an operational state of a computing device according to whether the signal is detected. The controlling step may involve disabling the computing device when the signal is not detected. Alternatively, the controlling step may comprise disabling the computing device when the signal is detected.

The method may also involve ascertaining a length of time that the signal is not detected. The controlling step may involve disabling the computing device only after a predetermined length of time that the signal is not detected. However, the controlling step may comprise disabling the computing device to varying degrees according to the length of time the signal is not detected. For example, the method may involve setting the computing device to first disabled state after a first predetermined length of time that the signal is not detected and setting the computing device to second disabled state after a second predetermined length of time that the signal is not detected. The first disabled state may include more functionality than the second disabled state. In some implementations, the computing device will be allowed to function in a fully operational state until the first predetermined length of time has elapsed.

The determining step may involve determining whether a radio frequency signal is detected. Alternatively, or additionally, the determining step may comprise determining whether an Internet Protocol signal is detected.

The method may include the step of providing the signal to a predetermined area. The predetermined area may, for example, comprise an area within which the computing device is authorized to function. The controlling step involve disabling the computing device (at least partially) when the computing device is transported outside the predetermined area, where the signal is not detected. The predetermined area may be a portal between an authorized area within which the computing device is authorized to function and an unauthorized area within which the computing device is not authorized to function. The controlling step may comprise disabling the computing device when the computing device is transported into the predetermined area, where the signal is detected.

The present invention provides hardware that is configured to perform the methods of the invention, as well as software to control devices to perform these methods. For example, some embodiments of the invention provide an apparatus comprising means for determining whether a signal is detected and means for controlling an operational state of a computing device according to whether the signal is detected.

The controlling means may be configured to disable the computing device when the signal is not detected. Alternatively, the controlling means may be configured to disable the computing device when the signal is detected.

The apparatus may also include means for ascertaining a length of time that the signal is not detected. The controlling means may be configured to disable the computing device only after a predetermined length of time that the signal is not detected.

The controlling means may be configured to disable the computing device to varying degrees according to the length of time the signal is not detected. For example, the controlling means may be configured to set the computing device to first disabled state after a first predetermined length of time that the signal is not detected and to set the computing device to second disabled state after a second predetermined length of time that the signal is not detected. The first disabled state may include more functionality than the second disabled state. The controlling means may be configured to allow the computing device to function in a fully operational state until the first predetermined length of time has elapsed.

The determining means may include means (e.g., a radio frequency interface), for determining whether a radio frequency signal is detected. Alternatively, or additionally, the determining means may comprise means (e.g., a wireless interface) for determining whether an Internet Protocol signal is detected. The controlling means may comprise a processor.

At least one of the determining means and the controlling means may be configured for communication with a motherboard of the computing device. At least one of the determining means and the controlling means may comprise an active radio frequency identification tag.

Another apparatus provided by the invention includes the following elements: a receiver for determining whether a signal is detected; and a processor configured for communication with the receiver and with a computing device. The processor is further configured for controlling an operational state of the computing device according to whether the receiver detects the signal. For example, the processor may be configured to disable the computing device when the receiver does not detect the signal. Alternatively, the processor may be configured to disable the computing device when the receiver detects the signal.

RFID

Figure 1:
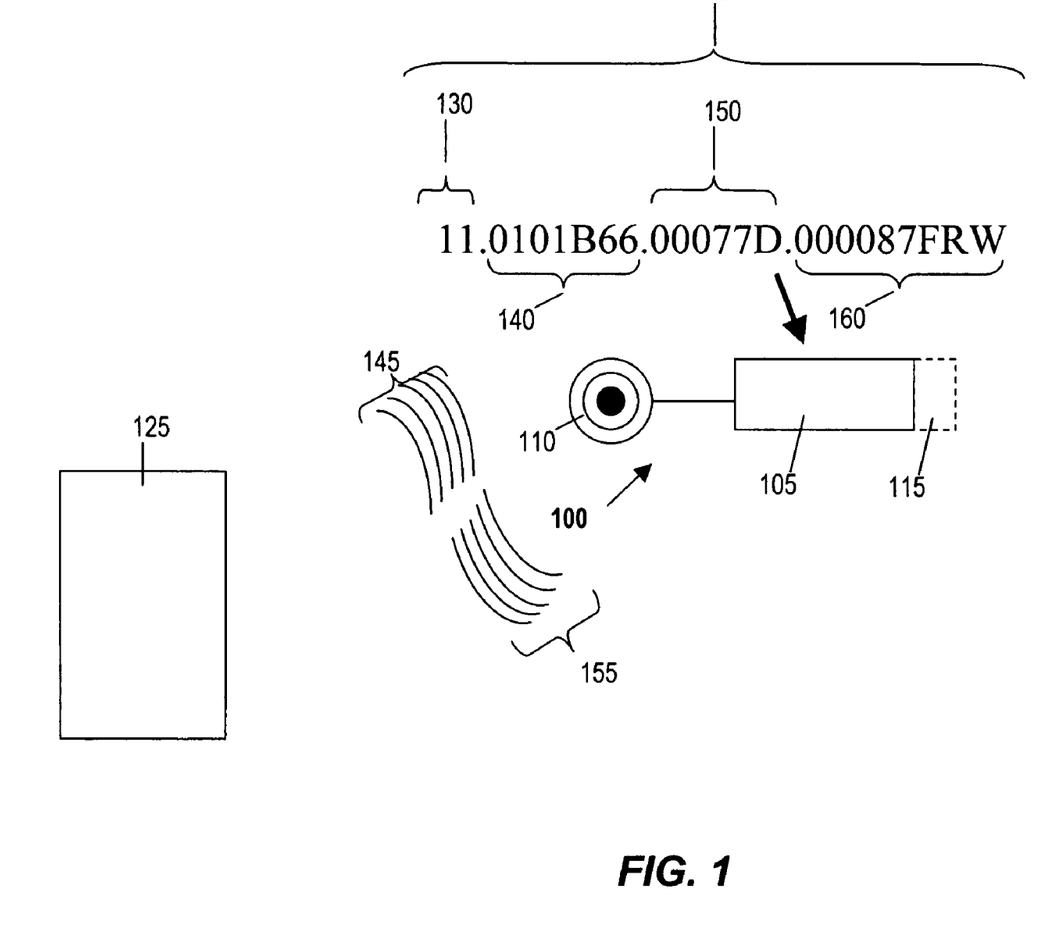
FIG. 1 is a diagram illustrating a radio frequency identification ("RFID") tag.

As shown in FIG. 1, an RFID tag 100 includes microprocessor 105 and antenna 110. In this example, RFID tag 100 is a "passive" RFID tag that is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

However, some implementations of the invention involve "active" RFID tags, which have their own battery (see optional battery 115) and can transmit at higher power levels than passive tags. Therefore, active RFID tags may be more effective in environments that are challenging for RF operation, such as those including metal (e.g., device chassis, shipping containers, etc.). Active RFID tags can transmit signals over relatively longer distances than passive RFID tags: some active tags have practical ranges of hundreds of meters.

Some active RFID tags, known as Class IV and Class V RFID tags, have additional capabilities. Class IV RFID tags may be configured for communication with other active RFID tags as well as with RFID readers. Some Class IV RFID tags may be configured for broad-band communication. Class V RFID tags are essentially readers with extended functionality. Class V RFID tags can power passive RFID tags and can communicate with readers, Class IV RFID tags and other Class V RFID tags.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24, published by EPCglobal® in 2004, which was ratified and made publicly available in August, 2006. EPCglobal® is a joint venture between GS1 (formerly known as EAN International) and GS1 US™ (formerly the Uniform Code Council, Inc.). EPCglobal® is an organization set up to achieve world-wide adoption and standardization of EPC technology.

One example of an RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

Some active RFID tags may be configured as read/write RFID tags, which can capture information regarding the history of products or groups of products, e.g., component changes, temperature and other environmental changes, stresses, accelerations and/or vibrations that have acted upon the product. It can be particularly useful to record such information for products that are relatively valuable and/or more subject to theft, spoilage or other damage, such as perishable foods and fragile items.

Some methods of the present invention can be used to provide information to update databases maintained by various entities (e.g., manufacturers, wholesalers, retailers, transportation companies and financial institutions). The information can be used not only to keep track of inventory, but also to resolve disputes (for example, regarding responsibility for product damage) to increase customer satisfaction, to avoid health risks, etc.

Figure 2:
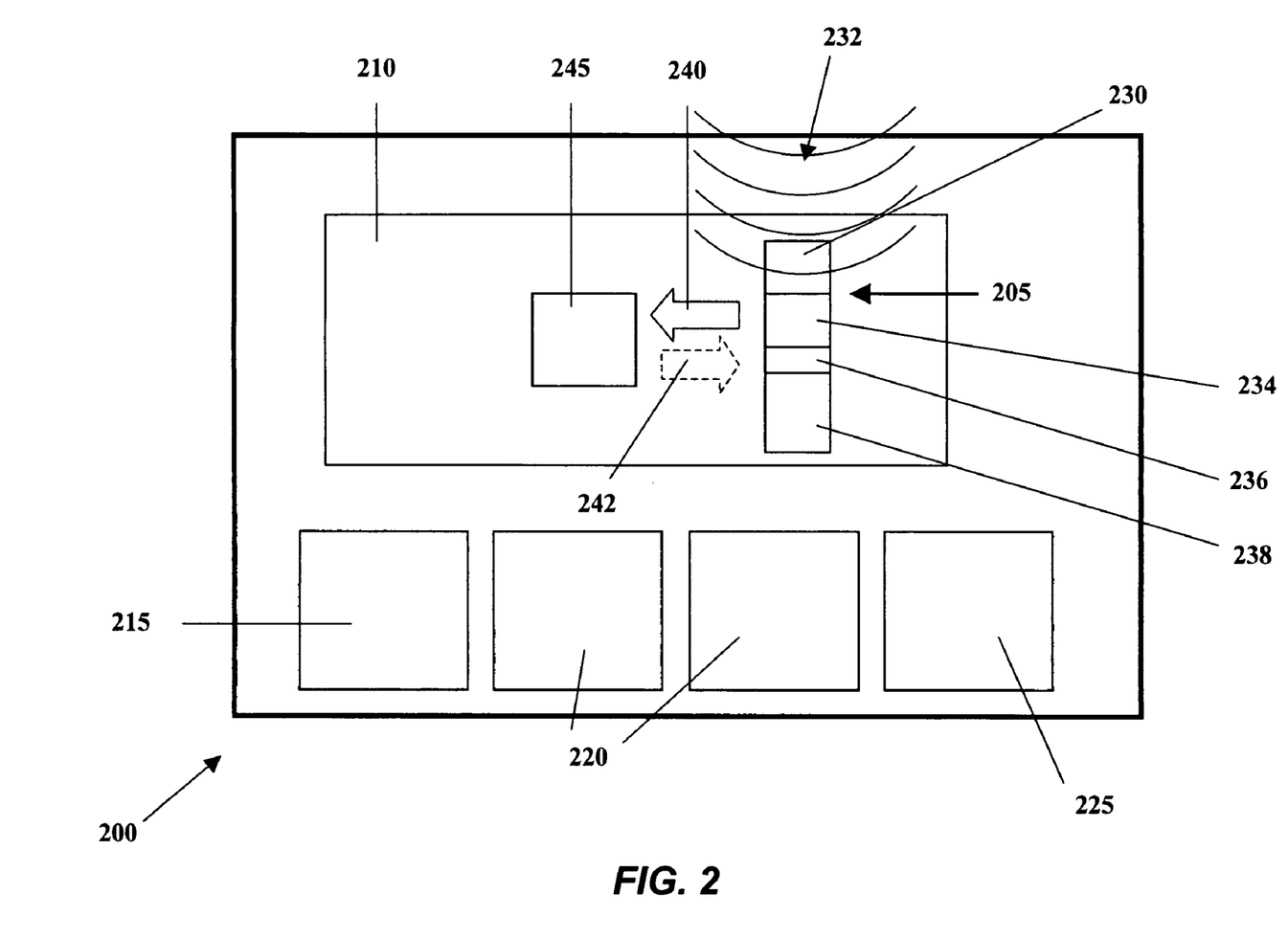
FIG. 2 is a block diagram of a device that includes a disabler.

FIG. 2 is a block diagram of a device that may be configured to implement some methods of the invention. In this example, device 200 is intended to generically represent a network device such as a server, a router, a switch, etc. Device 200 includes various modules 220 for performing its functions, which may be interfaces, blades, etc. However, in alternative embodiments, device 200 may be one of various types of devices, including but not limited to personal computers, telephony devices, copiers, printers, consumer electronic devices, etc.

Device 200 includes disabler 205 that is configured for communication with motherboard 210. In this example, disabler 205 is bridged onto motherboard 210, but in other embodiments disabler 205 may be configured for communication with motherboard 210 via some form of wireless communication, via network interface 215, etc.

Disabler 205 is preferably configured to communicate at least a disabling command 240 to central processing unit ("CPU") 245 of motherboard 210. As described elsewhere herein, in some implementations disabler 205 may cause device 200 to operate according to varying levels of functionality according to the circumstances. Therefore, disabler 205 may be configured to communicate various types of commands 240 to CPU 245.

Disabler 205 includes some type of receiver or detector, such as receiver 230, for detecting at least one predetermined type of signal 232. In some embodiments, disabler 205 is also configured to transmit signals. In some such embodiments, receiver 230 may be configured to both receive and transmit signals. For example, receiver 230 may comprise some form of antenna and may be configured to detect one or more types of RF signals. In some embodiments, disabler 205 comprises an active RFID tag that has been configured to perform some methods of the invention.

In alternative embodiments, disabler 205 is configured for communication according to one of the Institute of Electrical and Electronics Engineers' ["IEEE"] 802.11 standards. For example, disabler 205 may be configured for communication using an extension of existing 802.11 location-based services. As used herein, the terms "802.11" and the like refer to a set of wireless local area network ("WLAN") standards developed by working group 11 of the IEEE Standards Committee (IEEE 802). The referenced standards include, but are not limited to, the original IEEE 802.11 standard, which is now sometimes called "802.11 legacy."

According to such methods, the existing 802.11 infrastructure of a warehouse, storage room, lab, data center, or other location can be used to implement, at least in part, some features of the invention. Using a modified version of an existing 802.11 infrastructure could potentially avoid the expense of installing, e.g., a separate RFID-based system. Moreover, existing 802.11-based asset location and tracking systems can be extended, if so desired, to include information regarding the location of devices, e.g., of stolen devices. In some such implementations, disabler 205 may form a temporary association with a wireless access point. In this manner, disabler 205 may, e.g., receive a command indicating that device 200 should be disabled.

Disabler 205 preferably includes some form of logic device, such as processor 234, and at least one memory device, such as memory 236. Memory 236 preferably includes a non-volatile memory, which may preserve information of interest regarding disabler 205 and/or device 200. For example, such a non-volatile memory may save state information indicating, e.g., the circumstances under which a network device was removed from a data center. In some implementations of the invention, disabler 205 may receive such information via communications 242 from CPU 245.

Such information could be quite valuable for forensic purposes, both for the owner/lessor and the manufacturer of device 200. There are clauses in some device manufacturer's contracts that certain devices may be used for specific purposes only. Competitors' analysis and reverse engineering are not among these purposes. Accordingly a manufacturer may be interested to evaluate the state information stored in a non-volatile memory of disabler 205.

Memory 236 may store other types of information, e.g., information regarding the type of signal, sequence of signals, etc., that will indicate that a device should be enabled or disabled. Memory 236 may also store information regarding various states of enablement/disablement and corresponding conditions for these states. In some implementations, the conditions and/or states may be configurable. This topic is discussed in more detail elsewhere herein.

Disabler 205 preferably includes its own power supply (here, battery 238) to enable disabler 205 to operate at times when power supply 225 is switched off. Here, battery 238 is configured to recharge from chassis power supply 230 when chassis power supply 225 is switched on. When power supply 225 is on, disabler 205 may be powered from power supply 225 or from battery 238.

Figure 3A:
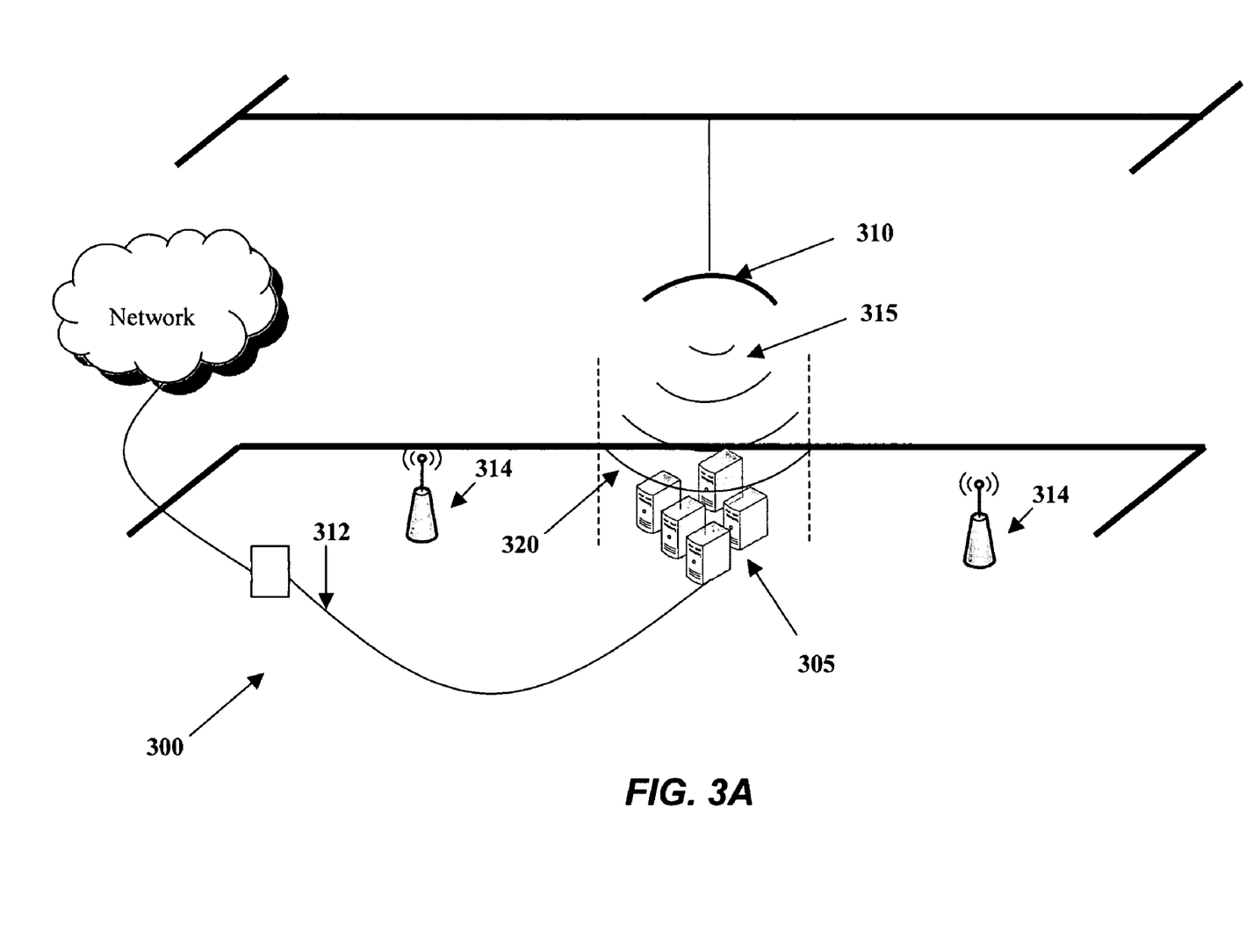
FIG. 3A illustrates one setting in which a disabler may be deployed.

FIG. 3A illustrates some examples of contexts in which a disabler may advantageously be deployed. In this example, one portion of data center 300 includes network devices 305, all of which include a disabler 205. However, other types of devices may be controlled in a similar fashion, e.g., personal computers, consumer electronic devices, telephony devices, etc.

Transmitter 310 causes signals 315 to be transmitted as a beacon within area 320. Transmitter 310 may comprise, for example, one or more antennae that are configured to focus signals 315 within area 320 via constructive and/or destructive interference. The disabler 205 within each of devices 305 allows the device to function as long as the disabler 205 detects signals 315.

In this example, transmitter 310 is causing RF signals to be transmitted continuously within area 320. However, the signals detected by disabler 205 may be any other convenient type of signal and/or sequence of signals, which may or may not be transmitted continuously. For example, disabler 205 may detect an "IP beacon" via a wired or wireless interface, e.g., from wired network connection 312 or from one of wireless access points 314. In such implementations, disablers 205 may allow devices 305 to functions if disablers 205 are receiving a predetermined type of IP packet, a predetermined sequence of IP packets, etc.

Figure 3B:
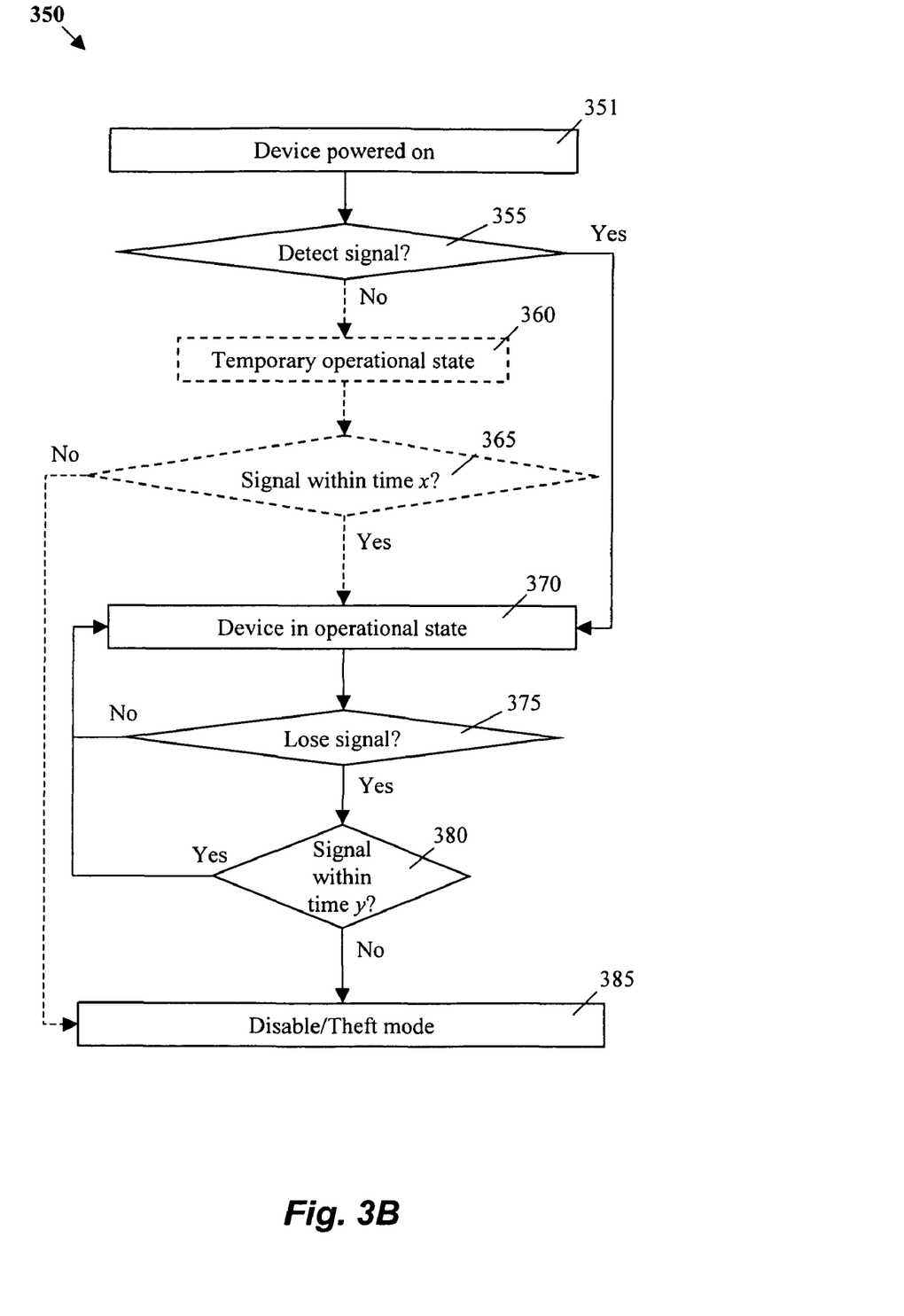
FIG. 3B is a flow chart that outlines a process of detecting theft and disabling a device in a setting such as that depicted in FIG. 3A.

The operation of some such examples of disabler 205 will now be described with reference to method 350 of FIG. 3B. The steps of the methods discussed herein, including but not limited to method 350, need not be performed (and in some implementations are not performed) in the order shown. Moreover, some implementations of the methods discussed herein may include more or fewer steps than those shown or described.

When one of devices 305 is powered on (step 351), disabler 205 determines whether a predetermined signal, sequence of signals, etc., is detected. (Step 355.) If a disabler 205 detects the proper signal, disabler 205 allows the respective device 305 to operate normally. (Step 370.)

In some implementations, if a disabler 205 does not detect the proper signal when a device 305 is powered on (or at other times), disabler 205 will not allow the device 305 to operate at all. In some such implementations, the device 305 may not be able to complete an initialization or "boot" sequence if disabler 205 does not detect the proper signal(s). Disabler 205 may trigger an alarm, cause one or more alert messages to be sent, etc. Disabler 205 may trigger even more drastic countermeasures, e.g., causing a capacitor to discharge a surge of electricity into the motherboard of device 305. Such responses may be desirable in high-security and/or military implementations.

However, such draconian responses are not preferable in most situations, in part because disabler 205 may be temporarily unable to detect an expected signal (e.g., an RF signal) for benign reasons. For example, disabler 205 may be temporarily unable to detect an expected signal because of atmospheric changes, a brief power fluctuation/outage, a piece of metal being temporarily moved between a transmitter and disabler 205, etc.

Therefore, even when a corresponding device 305 has not been moved from its proper location, it may not be reasonable to expect 100% "uptime" when disabler 205 will be able to detect the signal. Such drastic countermeasures would require undesirably frequent and often unnecessary intervention to re-enable (or even replace) devices 305.

Accordingly, in some preferred implementations, disabler 205 allows device 305 to operate at least temporarily even if disabler 205 does not immediately detect a signal. (Step 360.) If disabler 205 detects the signal within a predetermined time x, (determined in step 365), disabler 205 allows the device 305 to be fully operational. (Step 370.) Otherwise, disabler 205 will disable device 305, at least to some degree. (Step 385.)

In some implementations, step 385 may involve causing the state of device 305 to be a "theft state," in which device 305 is completely (or almost completely) disabled. One example code for indicating a theft state is "theft"; however, any convenient code may be used. Preferably, a device in theft state may subsequently be put into an operational state, e.g., via a key, a dongle, or some other enabling device. The enabling device may communicate with device 305 via a Universal Serial Bus ("USB") port, via a Bluetooth™ interface, an infrared interface, an RF interface, etc. The enabling device may be configured to provide necessary authentication, encryption, etc., to make it difficult for the unauthorized production and/or use of enabling devices. Some such enabling devices include a biometric device, such as a fingerprint scanner, to ensure that only authorized users are allowed to use the enabling device.

In some implementations, however, "theft state" may be a valid state of device 305. For example, when device 305 is in theft state, device 305 may be to some extent functional. In some such implementations, only certain functions of device 305 are no longer present when device 305 goes into theft state, but device 305 may be highly functional in other ways (at least initially). For example, device 305 may be allowed to send only management packets, packets of a certain protocol or packets from (or to) a certain IP address. In other implementations, theft state may mean that device 305 is barely functional or is completely inoperable.

In some implementations, theft state could mean progressively less functionality over a (preferably configurable) period of time (e.g., 2 hours, 5 hours, a day, etc.) if the device is not put back into a fully operational state. There may be multiple levels of disablement and corresponding multiple predetermined lengths of time. The lengths of time may be calculated from, e.g., the last time that disabler 205 detected a proper signal or the time that the device was powered on, if no signal was detected.

In such implementations, disabler 205 preferably has some way of determining the passage of time. For example, disabler 205 may include some type of timer, may be configured to communicate with a time server, etc. Moreover, disabler 205 may refer to a data structure in memory 236 that indicates times and corresponding operability/disability criteria that indicate the functionality of device 305 in each indicated state. The times and operability/disability criteria are preferably configurable.

A similar process may be applied when device 305 has been in an operational state. (Step 370.) If disabler 205 loses the signal (as determined in step 375), disabler 205 may determine whether the signal is detected within a time y. (Step 380.) Time y may or may not be the same time as time x. If no signal is detected within time y, disabler 205 causes the state of device 305 to be a theft state. (Step 385.) There may be multiple theft states corresponding to multiple levels of disablement. The levels of disablement may or may not correspond to multiple predetermined lengths of time.

Some implementations of the invention cause a device to go into a theft state when a predetermined signal is detected, e.g., when a device is near a "portal" or "choke point" corresponding to such a signal. These implementations may be used instead of, or in addition to, the previously-described implementations in which a device goes into theft state when a predetermined signal is not detected.

Figure 4A:
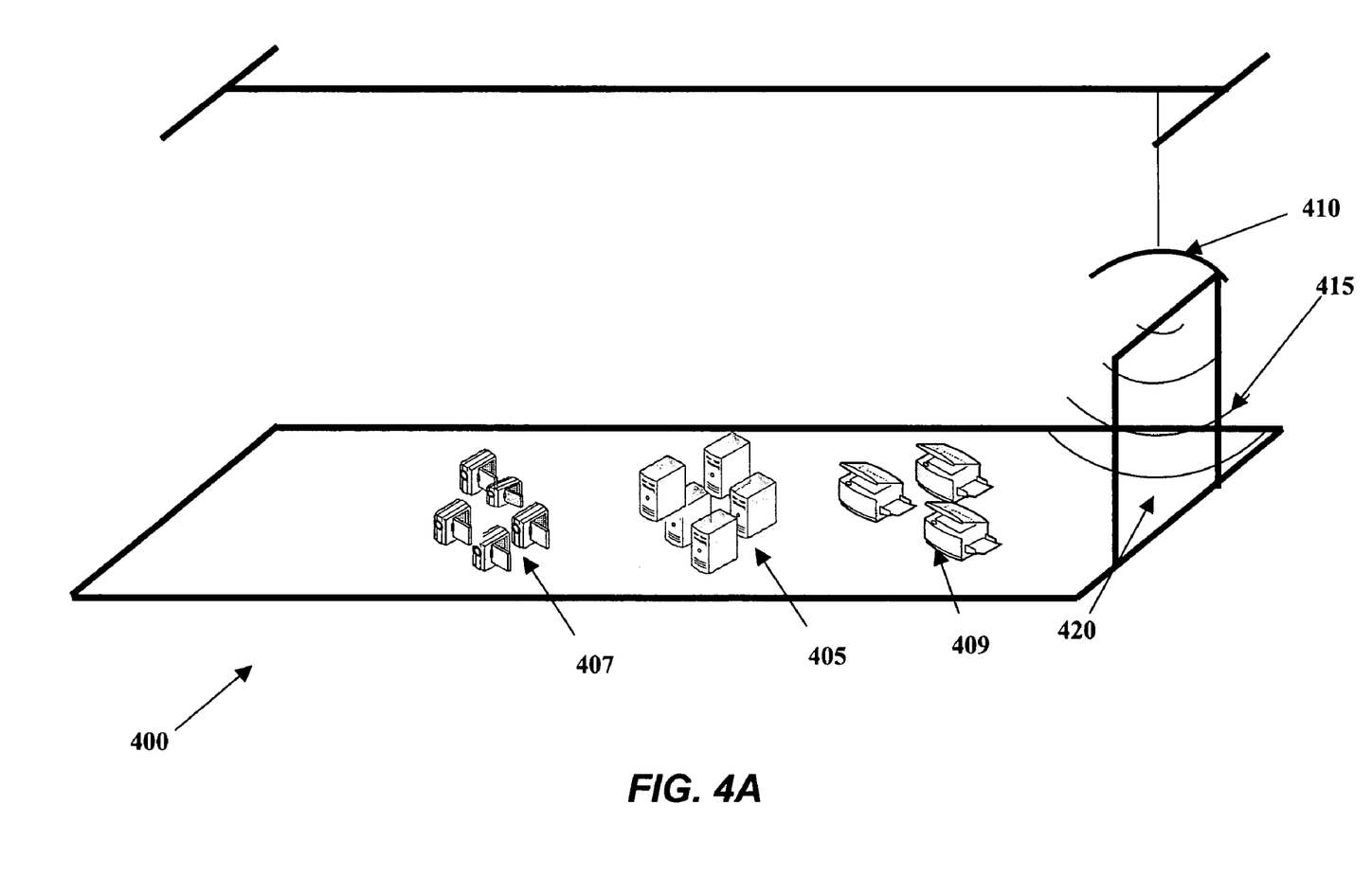
FIG. 4A illustrates an alternative setting in which a disabler may be deployed.

One such embodiment is depicted in FIG. 4A. Here, room 400 includes various valuable devices, including network devices 405, video cameras 407 and copiers 409. Here, transmitter 410 produces signals 415 in the vicinity of portal 420, which is an actual door in this example.

However, in other embodiments, portal 420 does not correspond with an actual door. Portal 420 may simply indicate the boundary of a zone, beyond which a device will be put into theft mode. For example, there could be a red stripe on the floor, a sign, or any other way of demarking a zone. Such a portal may be positioned within a data center to demark zones within which the equipment of company A and the equipment of company B may be operated. In some implementations, there may be no visible manifestation of a portal.

Figure 4B:
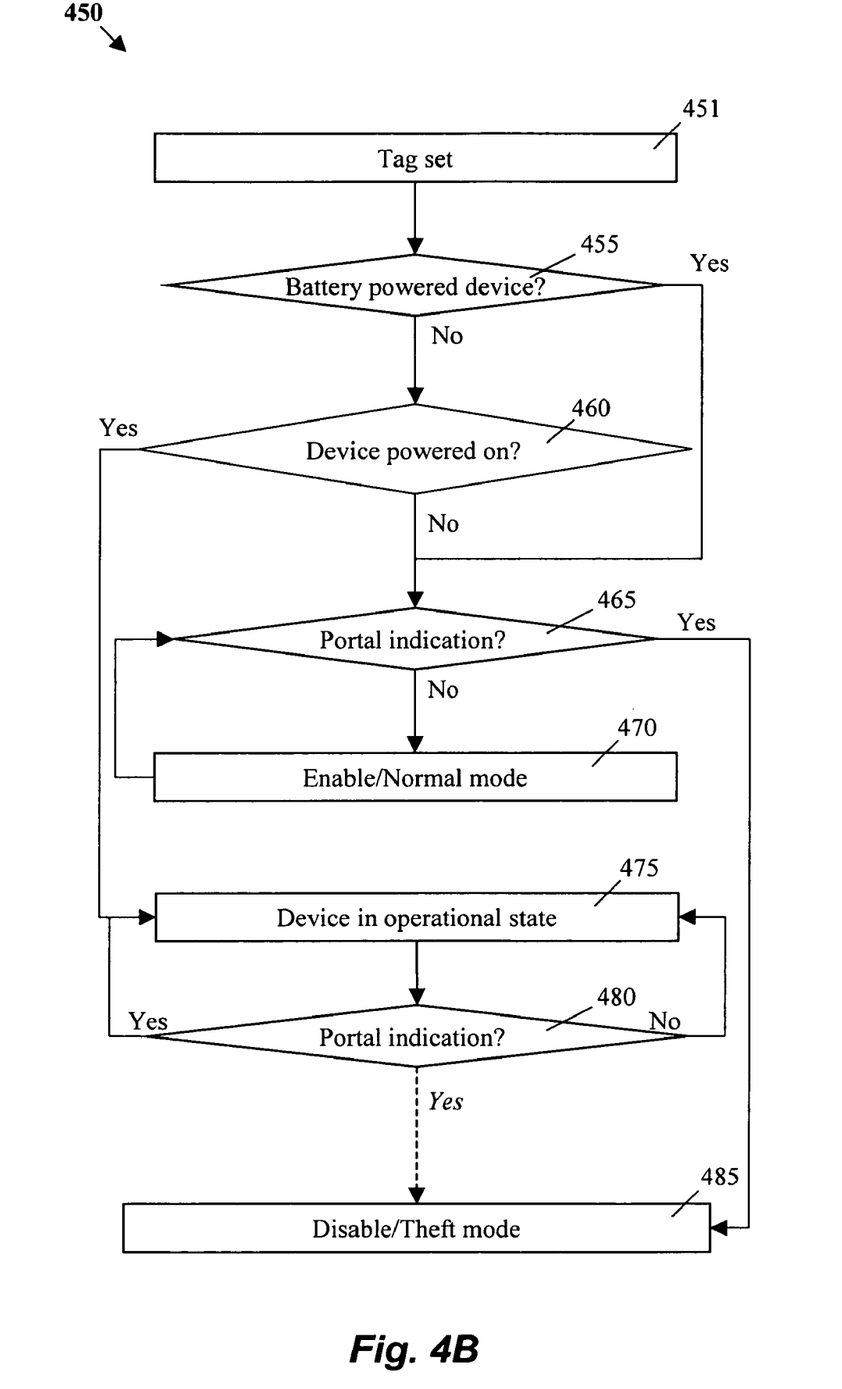
FIG. 4B is a flow chart that outlines a process of detecting theft and disabling a device in a setting such as that depicted in FIG. 4A.

Some examples of "portal" implementations will now be discussed with reference to FIG. 4B. Method 450 begins when a device is within an authorized zone, such as room 400. In this example, devices that are battery powered are treated differently from those that are powered from an electrical grid, i.e., plugged in. If the device is battery powered (as determined in step 455), and disabler 205 detects a signal corresponding with a portal (step 465), disabler 205 causes the device to be put into some type of theft state. (Step 485.) As noted above, there are many variants of theft states, which are preferably configurable.

However, if the device is not a battery-powered device and is powered on (as determined in step 460), in some implementations of the invention disabler 205 will allow the device to remain in a normal operational state even if disabler 205 detects a signal corresponding with a portal. (Step 480.) Disabler 205 may be able to detect when the device is powered on in various ways. For example, disabler 205 may determine that disabler 205 is has switched from being powered by battery 238 to being powered by power supply 225. (See FIG. 2.)

Method 450 may be desirable, for example, for implementations in which some devices are expected to be operating under power from the electrical grid within an authorized area. For example, when a network device in a data center is plugged in and operational within an authorized area, its disabler may detect, on occasion, a signal from a nearby portal due to a transient effect on the signal. In one such example, the signal may be inadvertently reflected towards the network device. In such circumstances, it is not desirable to disable the network device or to cause the network device to enter a state of reduced functionality. However, one may still wish to disable battery-powered devices that are removed from the authorized area.

Figure 5:
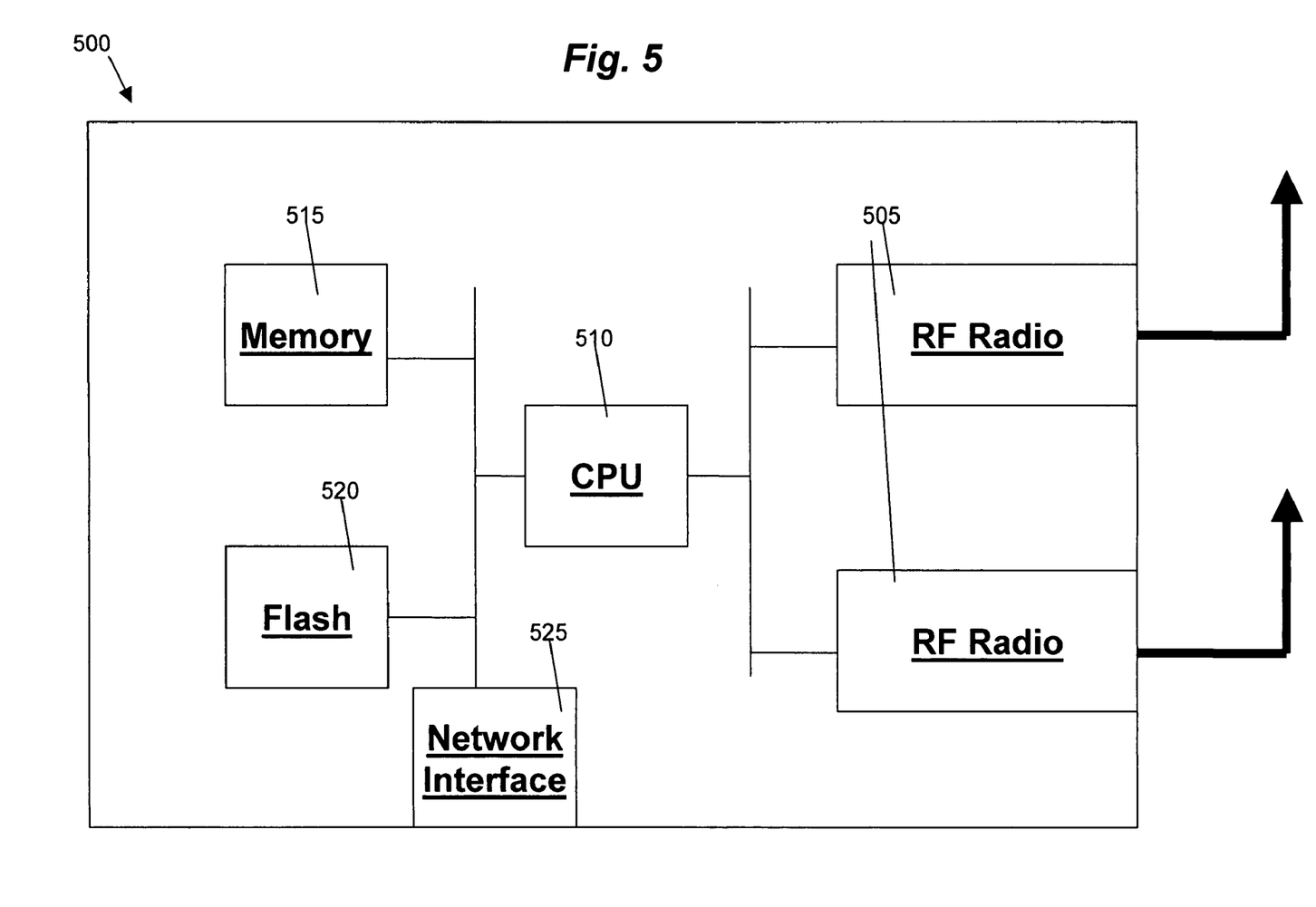
FIG. 5 is a block diagram of an RFID reader.

FIG. 5 illustrates an RFID reader that can be configured to perform methods of the present invention. RFID reader 500 includes one or more RF radios 505 for transmitting RF waves to, and receiving modulated RF waves from, RFID tags. RF radios 505 provide raw RF data that is converted by an analog-to-digital converter (not shown) and conveyed to other elements of RFID reader 500. In some embodiments, these data are stored, at least temporarily, by CPU 510 in memory 515 before being transmitted to other parts of an RFID network via network interface 525. Network interface 525 may be any convenient type of interface, such as an Ethernet interface.

Flash memory 520 is used to store a program (a "bootloader") for booting/initializing RFID reader 500. The bootloader, which is usually stored in a separate, partitioned area of flash memory 520, also allows RFID reader 500 to recover from a power loss, etc. In some embodiments of the invention, flash memory 520 includes instructions for controlling CPU 510 to form "DHCPDISCOVER" requests to initiate a provisioning/configuration cycle. In some implementations, flash memory 520 is used to store personality information and other configuration information obtained from, e.g., a DHCP server during such a cycle.

However, in preferred implementations, such information is only stored in volatile memory 515 after being received from, e.g. a DHCP server. There are advantages to keeping RFID devices "dumb." For example, a network of dumb RFID devices allows much of the processing load to be centralized, instead of being performed by the RFID devices. Alternatively, the processing load can be decentralized, but only to trusted devices.

Configuration information is downloaded from, e.g., a central server to memory 515. Updates may be instigated by the central server or selected, trusted devices. New versions of the image file (e.g., the running, base image necessary to operate the RFID device) are copied into flash memory 520. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 6:
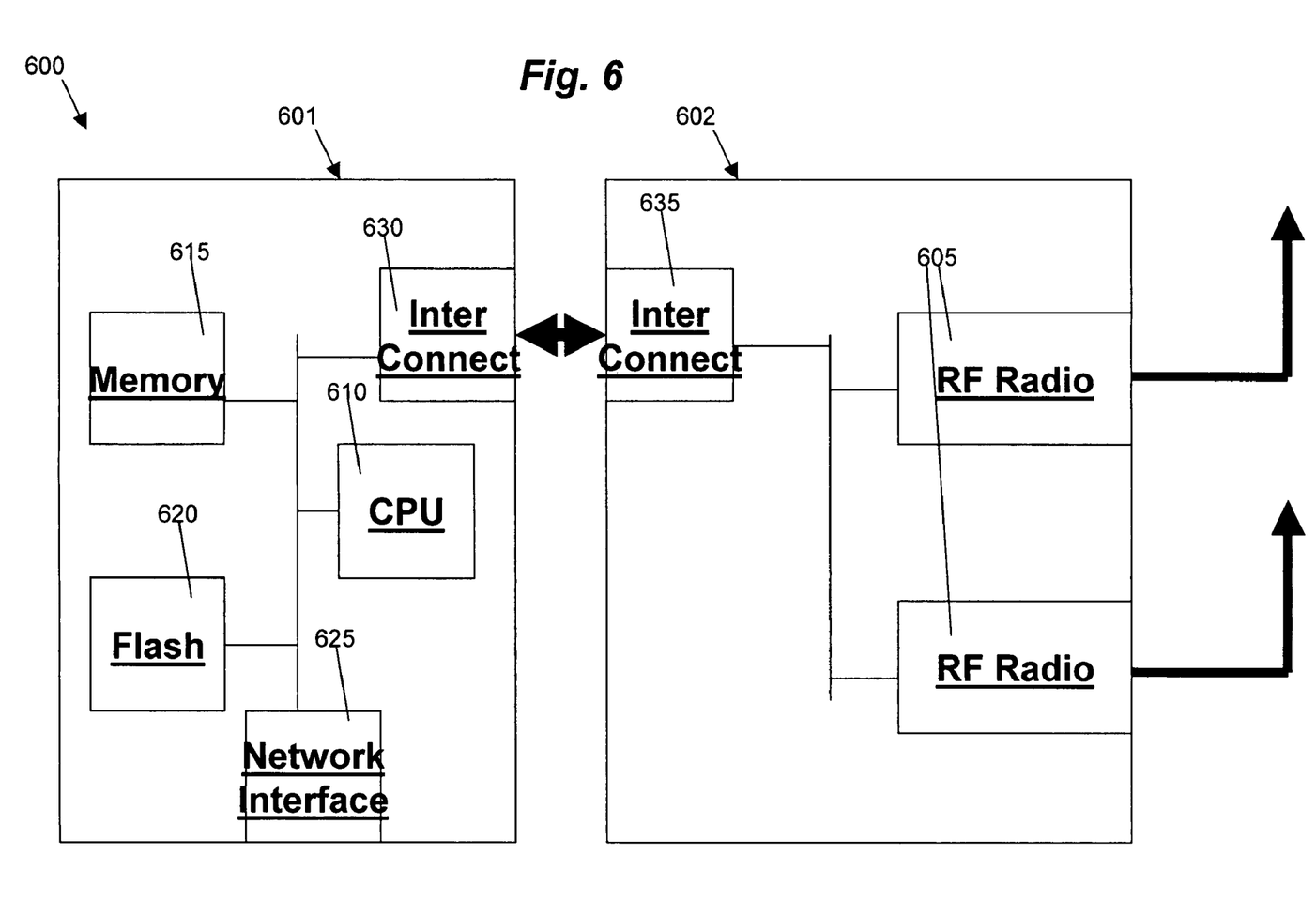
FIG. 6 is a block diagram of an RFID system.

FIG. 6 illustrates RFID system 900 that includes control portion 601 and RF radio portion 602. The components of control portion 601 are substantially similar to those described above with reference to FIG. 5. Interconnect 630 of control portion 601 is configured for communication with interconnect 635 of RF radio portion 602. The communication may be via any convenient medium and format, such as wireless, serial, point-to-point serial, etc. Although only one RF radio portion 602 is depicted in FIG. 6, each control portion 601 may control a plurality of RF radio portions 602. RFID system 600 may be deployed on a single framework or chassis (e.g., on a forklift) or in multiple chassis.

Other Embodiments

The methods of the present invention may be implemented, at least in part, by hardware and/or software. For example, some embodiments of the invention provide computer programs embodied in machine-readable media. The computer programs include instructions for controlling one or more devices to perform the methods described herein.

Although illustrative embodiments and applications of this invention are shown and described herein, many variations and modifications are possible which remain within the concept, scope, and spirit of the invention, and these variations would become clear to those of ordinary skill in the art after perusal of this application.

For example, some implementations of the invention involve theft detection and/or disabling commands via devices other than a portable disabler 205. An RFID reader (or other device) positioned in or near a portal may determine that a device is being stolen, e.g., by reading an RFID tag of the device. The RFID reader may cause the device to go into a theft state or may activate a disabler. Alternatively, the RFID reader (or other theft-detecting device) may send an alert to a server, a host device, a network administrator, etc., any of which may cause a device to enter some type of theft state. In some such implementations, even if the device is powered off, a communication may be sent to a disabler indicating that the device has been stolen. The disabler may respond by disabling the device to the degree indicated.

Accordingly, the present embodiments are to be considered as illustrative and not restrictive, and the invention is not to be limited to the details given herein, but may be modified within the scope and equivalents of the appended claims.

We claim:

1. A method, comprising:
   determining by a computing device whether a signal is detected;
   controlling an operational state of the computing device according to whether the signal is detected; and
   ascertaining a length of time that the signal is not detected, wherein the controlling step comprises disabling the computing device to varying degrees according to the length of time the signal is not detected;
   wherein disabling the computing device to varying degrees comprises:
      setting the computing device to first disabled state after a first predetermined length of time that the signal is not detected; and
      setting the computing device to second disabled state after a second predetermined length of time that the signal is not detected, wherein the first disabled state includes more functionality than the second disabled state.

2. The method of claim 1, wherein the computing device cannot be removed from the second disabled state until an enabling device communicates with the computing device.

3. The method of claim 1, wherein the determining step comprises determining whether a radio frequency signal is detected.

4. The method of claim 1, wherein the determining step comprises determining whether an Internet Protocol signal is detected.

5. The method of claim 1, wherein the signal is provided to a predetermined area.

6. The method of claim 5,
   wherein the predetermined area comprises an area within which the computing device is authorized to function, and wherein the controlling step comprises disabling the computing device when the computing device is transported outside the predetermined area, where the signal is not detected.

7. The method of claim 5, wherein the predetermined area comprises a portal between an authorized area within which the computing device is authorized to function and an unauthorized area within which the computing device is not authorized to function.

8. The method of claim 1, further comprising the step of allowing the computing device to function in a fully operational state until the first predetermined length of time has elapsed.

9. The method of claim 1, wherein the enabling device does not generate the signal.

10. The method of claim 1, wherein disabling the computing device is performed by a disabler of the computing device.

11. The method of claim 1, wherein when the computing device is in the second disabled state, the computing device is prevented from completing an initialization or boot sequence.

12. The method of claim 1, wherein the enabling device communicates with the computing device via a port or interface of the computing device.

13. The method of claim 1, further comprising:
receiving by the computing device a communication from an enabling device;
wherein the computing device enters an enabled state from the second disabled state after receiving the communication from the enabling device.

14. The method of claim 13, wherein after the computing device enters the enabled state, the computing device remains in the enabled state without being in communication with the enabling device.

15. The method of claim 13, wherein after the computing device enters the enabled state, the computing device does not enter a disabled state if a communication is not received from the enabling device.

16. The method of claim 1, wherein when the computing device is in the second disabled state, the operational state of the computing device cannot be controlled according to whether the signal is detected until an enabling device communicates with the computing device.

17. An apparatus comprising:
means for determining by a computing device whether a signal is detected;
means for controlling an operational state of the computing device according to whether the signal is detected; and
means for ascertaining a length of time that the signal is not detected, wherein the controlling means is configured to disable the computing device to varying degrees according to the length of time the signal is not detected;
wherein the controlling means comprises:
means for setting the computing device to first disabled state after a first predetermined length of time that the signal is not detected; and
means for setting the computing device to second disabled state after a second predetermined length of time that the signal is not detected, wherein the first disabled state includes more functionality than the second disabled state.

18. The apparatus of claim 17, wherein the determining means comprises means for determining whether a radio frequency signal is detected.

19. The apparatus of claim 17, wherein the determining means comprises means for determining whether an Internet Protocol signal is detected.

20. The apparatus of claim 17, wherein the determining means comprises a radio frequency interface.

21. The apparatus of claim 17, wherein the determining means comprises a wireless interface.

22. The apparatus of claim 17, wherein the controlling means comprises a processor.

23. The apparatus of claim 17, wherein at least one of the determining means and the controlling means are configured for communication with a motherboard of the computing device.

24. The apparatus of claim 17, wherein at least one of the determining means and the controlling means comprises an active radio frequency identification tag.

25. The apparatus of claim 17, wherein the controlling means is configured to allow the computing device to function in a fully operational state until the first predetermined length of time has elapsed.

26. A computer-readable medium storing thereon computer-readable instructions for causing a computing device to perform the following steps:
determining by the computing device whether a signal is detected;
controlling an operational state of the computing device according to whether the signal is detected; and
ascertaining a length of time that the signal is not detected, wherein the controlling step comprises disabling the computing device to varying degrees according to the length of time the signal is not detected;
wherein disabling the computing device to varying degrees comprises:
setting the computing device to first disabled state after a first predetermined length of time that the signal is not detected; and
setting the computing device to second disabled state after a second predetermined length of time that the signal is not detected, wherein the first disabled state includes more functionality than the second disabled state.

27. The computer-readable medium of claim 26, wherein the computer-readable instructions cause the computing device to perform the following steps:
allowing the computing device to function in a fully operational state until the first predetermined length of time has elapsed.

28. The computer-readable medium of claim 26, wherein the computing device cannot be removed from the second disabled state until an enabling device communicates with the computing device.

29. The computer-readable medium of claim 26, wherein when the computing device is in the second disabled state, the computing device is prevented from completing an initialization or boot sequence.

30. The apparatus of claim 26, wherein determining comprises determining whether a radio frequency signal is detected.

31. The apparatus of claim 26, wherein determining comprises determining whether an Internet Protocol signal is detected.

* * * * *